Aug. 21, 1956

R. L. KINDRED 2,759,992

MANUAL COLOR SYNC CONTROL

Filed Aug. 16, 1952

WITNESSES:

E. A. McCloskey.

Leon M. Garman

INVENTOR

Raymond L. Kindred.

BY

F. E. Browder

ATTORNEY

United States Patent Office 2,759,992

Patented Aug. 21, 1956

2,759,992

MANUAL COLOR SYNC CONTROL

Raymond L. Kindred, Selinsgrove, Pa., assignor to Westinghouse Electric Corporation, East Pittsburgh, Pa., a corporation of Pennsylvania Application August 16, 1952, Serial No. 304,790

7 Claims. (Cl. 178—5.4)

My invention relates to color television receivers and in particular relates to an arrangement insuring the correct connection of incoming color-picture signals to the color television receiver which uses separate channels for applying the respective signals representing the different color-images to modulate the scanning beams which excite the receiver screen.

The authorized color television systems today transmit, in time sequence, a television signal representing the red color-field of the picture, then a signal representing the blue color-field of the picture, and then a signal representing the green color-field of the picture, and continue this program as long as the picture is being sent out. In practice each of the successive fields covers the entire picture area and the system is known as "field-sequential." I here describe my invention as applied to such a system.

In such a system pictures may be reproduced by having a first electron-gun bombard a red-emitting phosphor on a fluorescent screen when a red-light image is being transmitted; a second electron-gun bombard a blue-emitting phosphor when the blue-light image is coming in; and a third electron-gun bombard a green-emitting phosphor when the green-light image is coming in, the respective image signals being made to modulate the three beams in correspondence with the intensities of the respective light-images at the transmitter in the same way that an ordinary monochrome television receiver beam is modulated to reproduce black-and-white pictures. Picture-receiver tubes for this system may be referred to as "tri-color tubes"; and in one suitable type, the fluorescent screen comprises horizontal strips of phosphors which are subdivided into groups of three, the strips of each group emitting respectively red, blue and green light under impact of an electron scanning beam. Such tri-color tubes are described in greater detail in the October 1951 Proceedings of the Institute of Radio Engineers.

In such a field-sequential transmission, the beginning of a new, and differently colored, field coincides with a vertical synchronizing signal, and the electron-gun in the screen-scanning-system which is bombarding, let us say, the phosphor emitting red light should be shut-off and the electron-gun furnishing a blue image should be turned on, upon arrival of a vertical synchronizing signal.

However, the field-synchronizing signals are all alike, comprising a series of short rectangular voltage pulses, and it is necessary to provide some means at the receiver to keep the red- and blue-exciting electron guns shut off, and the green-exciting electron gun turned on, when the signals for the green-image field are coming in; and so on, for the fields representing the other colors. Such a means may be referred to as "gating" the respective color signals for the receiver-tube.

One object of my invention is to provide an arrangement for switching scanning beams off and on successively in correspondence with incoming signals which are to control them.

Another object is to provide a switching device for turning on one of a group of scanning beams and shutting off others of said group in synchronism with signal changes, and for changing at will the member of the group which a particular signal turns on.

Another object is to provide means whereby incoming color-signals in a color-television receiver may be switched at will among a plurality of scanning-systems so that signals for a given color will cause stimulation of the phosphor of the same color on the output screen.

Other objects of my invention will become apparent upon reading the following description taken in connection with the drawings in which.

Figure 1:
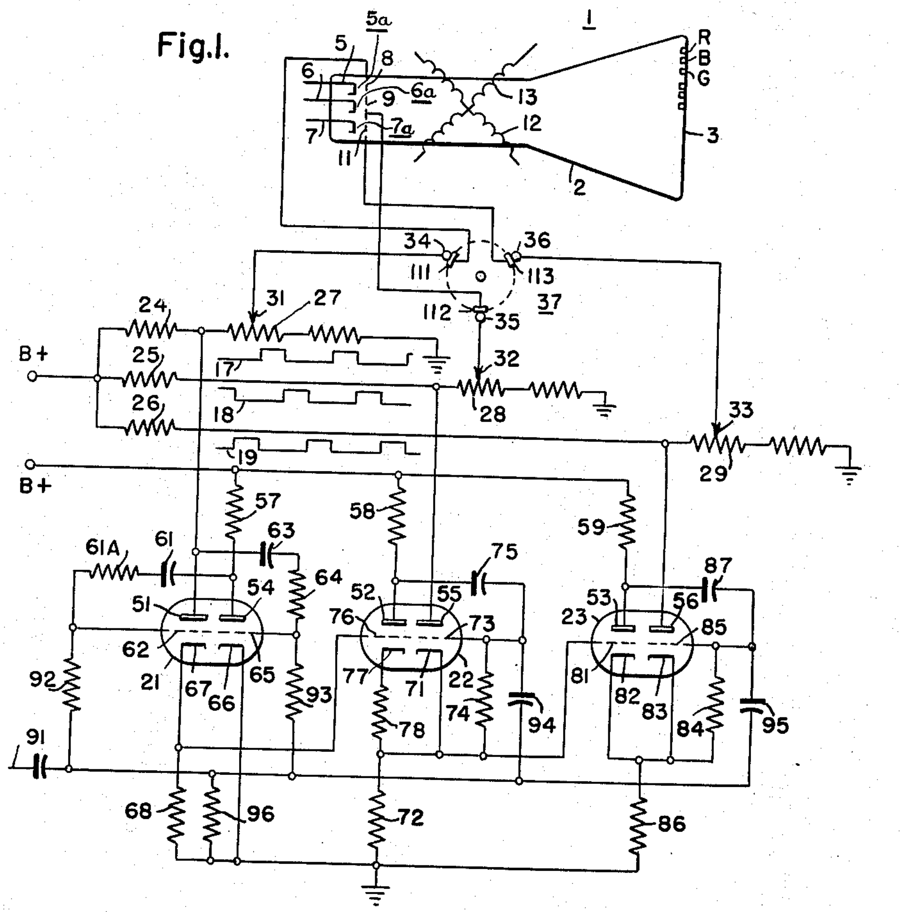
Fig. 1 is a schematic diagram of a circuit in connection with which my invention is employed.

Referring in detail to Fig. 1, picture-reproducing tube 1 comprises a vacuum-tight container 2 having a fluorescent output screen 3 at one end and three electron-guns *5a*, *6a* and *7a* at its other end, the latter being provided with control-electrodes and being otherwise so similar to those known in the television picture-receiver tube art that further description here is believed to be unnecessary. The screen 3 comprises horizontal strips of phosphor divided into groups of three R, B, G, which respectively emit red, blue and green light when bombarded by scanning-beams of conventional type from the electron-guns *5a*, *6a* and *7a* respectively. The groups of three strips preferably occupy about the same vertical space as one horizontal line on a conventional black-and-white television receiver-tube screen.

The tube 1 is provided with conventional beam-deflecting means 12, 13 which cause the scanning-beams to scan the screen 3 in horizontal lines in the way usual in television picture-receivers, painting a picture of intensity varying from point-to-point under influence of signal voltages impressed on the cathodes 5, 6 and 7. As previously explained, the beam from electron-gun associated with cathode 5 is first turned on to scan the red-emitting strips R on screen 3 during transmission of a red-light picture field, the electron-guns associated with cathodes 6 and 7 being turned off; the electron-gun associated with cathode 6 then is turned on to scan the blue-emitting strips B during the blue-image frame, the guns associated with cathodes 5 and 7 being turned off; an electron-gun associated with cathode 7 then scans the screen during transmission of the green-image frame. This program is followed as long as the television transmission continues.

The turning-on and shutting-off of the electron-guns in accordance with this program is effected by periodic rectangular gating pulses of voltage derived from the remaining circuit elements shown in Fig. 1. The form of these voltage pulses is indicated at 17, 18 and 19, and they are generated by the three electron tubes, each of the twin-triode type. Three channels respectively comprising first resistors 24, 25, 26 in series with voltage dividers 27, 28, 29 are connected between the positive terminal B of a voltage source and its grounded negative terminal. Variable taps 31, 32, 33 on these voltage dividers connect them respectively to the equally spaced stationary contacts 34, 35, 36 of a three channel drum-switch 37. This switch 37 has a rotary member bearing three equally-spaced movable-contacts 111, 112, 113 which are respectively connected to the control-electrodes 8, 9, 11.

The lower terminals of resistors 24, 25, 26 are respectively connected to one anode 51, 55, 56 of the twin-triodes 21, 22, 23. The other anodes 54, 52, 53 in each said twin-triode is connected through a resistor 57, 58, 59 to the positive terminal of source B.

The anode 54 is connected through a capacitor 61 and resistor 61A to the control-grid 62 in tubes 21, and the anode 51 in that tube is connected through a capacitor 63 and a resistor 64 to the control grid 65 of tube 21. The cathode 66 associated with anode 54 is connected directly to ground, and the other cathode 67 of tube 21 is connected to ground through a resistor 68. The circuits of tube 21 will be recognized as making it a free-running multi-vibrator.

The cathode 71 associated in twin-triode 22 with anode 55 is connected to ground through a resistor 72 and to its control-grid 73 through a resistor 74. Control-grid 73 is connected to anode 52 of tube 22 through a capacitor 75. Control-grid 76 associated with anode 52 is connected to cathode 67 of tube 21, while the associated cathode 77 is connected through a resistor 78 to the cathode 71, and to a control-grid 81 which governs current flow to anode 53 in tube 23. The cathode 82 associated with anode 53 is connected to cathode 83 in the same tube and is connected through a resistor 84 to the control-grid 85 which governs current from cathode 83, and is connected to ground through resistor 86. Control-grid 85 is connected to anode 53 in the same tube 23 through a capacitor 87.

An input terminal 91 on which is impressed the vertical sync pulse or vertical retrace pulse which intervenes between every pair of fields is connected through capacitor 91 and a pair of resistors 92 and 93 to the control-grids 62 and 65 in tube 21; is connected through a capacitor 94 to the control-grid 73 in tube 22, and is connected through a capacitor 95 to the control-grid 85 in tube 23. A shunt resistor 96 connects the input-terminal 91 to ground. With the above described connections, tubes 22 and 23 act as one-shot multivibrators. All three twin-triodes 21, 22, 23 may be of the 12AU7 type.

The control-grids of the tubes 21, 22 and 23 are so biased that, in absence of vertical sync pulses on input-terminal 91, tube 21 will act as a free-running multivibrator, and together with the tubes 22 and 23 would turn the electron guns associated with cathodes 5, 6 and 7 on and off at a random rate determined by the time constants of the circuits interconnecting the electrodes of those tubes.

The first vertical sync pulse coming into input-terminal 91 appears at once at control-grid 65 of tube 21 and initiates the pulsing cycle of multivibrator tube 21, and impresses a positive pulse through voltage divider 27, tap 31 thereof and switch 37 on the control-electrode 8 in picture-tube 1. This turns on electron-gun 5 to scan the red-emitting phosphor on screen 3 therein, and this scanning continues for the duration of the positive pulse from multivibrator 21.

The capacitors and resistors of tube 21 are adjusted to make the length of the positive pulse equal to the period of one field of the incoming picture, and this assisted by the effect of the next vertical sync pulse impressed through resistor 92 on grid 62, decreases the positive voltage at tap 31 and electron-gun control-electrode 8, and ends the positive pulse shown at curve 17.

The current flow from anode 51 and cathode 67 of tube 21 through resistor 68 impresses a positive voltage on the grid 76 of one-shot multivibrator 22, thereby starting it upon the voltage cycle indicated by curve 18 to turn on the scanning-beam from electron-gun associated with cathode 6 in picture-tube 1 and cause it to scan the blue-emitting phosphor on screen 3, just as was previously described for the control of electron-gun associated with cathode 5 by the voltage of curve 17.

At the end of the pulse-period of multivibrator 22, its resistor 72 impresses a pulse to initiate the pulse-period of one-shot multivibrator 23 which turns-on and shuts-off the electron-beam from electron-gun associated with cathode 7 which scans the green-emitting phosphor B on screen 3 of picture-tube 1 in a way similar to that described for control of electron-guns associated with cathodes 5 and 6.

However, it will be noted that there is no assurance in the above-described operations that the initial vertical sync pulse to arrive at input electrode is one preceding a red-image frame rather than a green-image frame or a blue one; yet multivibrator 21 always acts first and turns on the beam from the electro-gun associated with cathode 5 which stimulates a red-emitting phosphor. Thus an image which corresponds with green light, let us say, in the picture at the transmitter may be presented to the observer's eyes at the receiver in red light. In short, the picture colors may not be correctly reproduced.

This error may be corrected by manipulating the manual switch 37 which makes it possible to change the electron-guns which the respective multivibrators 21, 22, 23 energize. If it is apparent at the receiver that the picture colors are incorrect, the switch 37 is turned through 120 degrees. If the trouble in the picture disappears, well and good; but if colors are still wrong, switch 37 is turned through another 120 degrees. Correct colors are bound to appear for one of its three positions.

While I have described a particular servo-device for synchronizing the color-presentation with incoming sequential color-signals, it will be evident to those skilled in the art that any system in which the different color signals flow through separate control-channels at the receiver may face the problem of insuring that they respectively stimulate light of their own color; and my switching-device is applicable accordingly to any such systems, rather than limited to the particular servo-arrangement I have used here to illustrate its principles.

Figure 2:
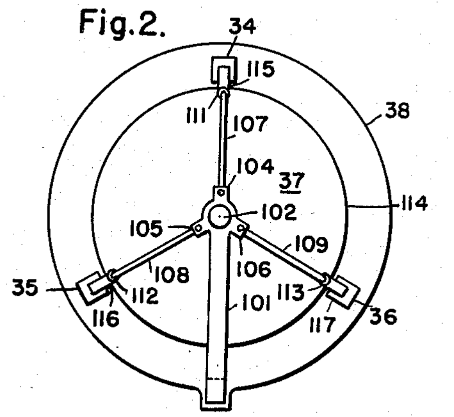
Fig. 2 is a front elevation and Fig. 3 a side view of a manual switching device suitable for use in television receivers embodying my invention.
Figure 3:
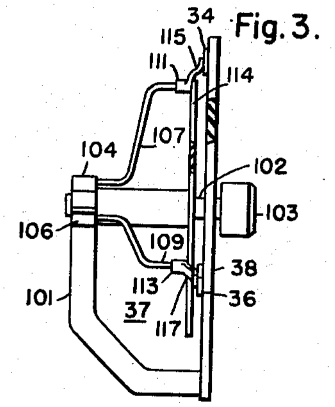

Referring to Figs. 2 and 3, the drum switch 37 may comprise an annular frame 38 of insulating material having positioned at three points equally spaced about its circumference the stationary contacts 34, 35 and 36. A bracket 101 supports a bearing in which is seated the end of a central shaft 102 which may be turned by some suitable means, such as a knob 103. Insulating supports 104, 105, and 106 on the arm 101 support the ends of three flexible conductors 107, 108 and 109 having their opposite ends respectively set in terminals 111, 112, and 113 which are supported on a ring 114 of insulating material which is attached to the shaft 102. The respective terminals 111, 112 and 113 are provided with flexible brushes 115, 116 and 117 spaced properly to bear simultaneously on the contacts 34, 35 and 36. The terminals 104, 105 and 106 are respectively connected to the control grids 8, 9 and 11 of the tube 1, while the terminals 34, 35 and 36 are connected as indicated in Fig. 1.

The flexible conductors 107, 108 and 109 are made long enough so that the ring 114 may be turned through 240 degrees of arc. Thus the flexible brush 115 can be so positioned as to contact either the stationary contact 34, the stationary contact 35 or the stationary contact 36; and similar statements apply to the other flexible brushes and stationary contacts. The drum switch 37 is, therefore, capable of acting to switch the circuits between the control electrodes 8, 9 and 11 and the movable taps 31, 32 and 33 as has been described above.

I claim as my invention:

1. In combination with a tricolor television picture receiving tube having three scanning-beam control-means, and three control-channels for said control means, a three-position switch for color phasing said three control-channels in phase with a particular received color signal having three stationary contacts and a movable member having three line-terminals thereon, guide means for said movable member causing each said terminal to successively make electrical contact with each said stationary contact in the course of its motion, manual means for moving said movable member at will from position to position in which such electric contacts are made, and connections from said control-channels to said stationary contacts and from said scanning-beam control-means to said line terminals.

2. In combination with a tricolor television picture receiving tube having three scanning-beam control means and three control-channels for said control means, a switch for color phasing said three control-channels in phase with a particular received color signal having a rotatable member which supports a set of three symmetrically-spaced contacts and also having a set of three stationary contacts positioned along the path of movement of said symmetrically-spaced contacts in position to engage them simultaneously as said rotatable member is turned, and means for moving said rotatable member to cause each rotatable contact successively to engage said three stationary contacts, said scanning-beam control-means being connected to one said set and said control-channels being connected to the other said set.

3. In a television receiver, a color phasing system comprising a first set of channels for respectively controlling means presenting a received picture in lights of different color, a second set of channels respectively energizing and deenergizing said controlling means, switching means having a set of movable contacts, one for each said color, and a set of stationary contacts, one for each said color, said movable contacts being each movable into engagement successively with all said stationary contacts, the respective members of one of said sets of contacts being connected respectively to said first set of channels and the respective members of said other set of contacts being connected respectively to said second set of channels, and means for moving each said movable contact successively into engagement with each said stationary contact.

4. In combination with a color television receiver picture tube for reproducing a televised picture in a plurality of colors, said tube having electron beam means adapted for reproducing each of said colors and means for applying color signals to said electron beam means, a plurality of sources of control signals, with one of said sources being provided for each of said colors to be reproduced, control means for said electron beam means, and a color phasing switching member connected between said control means and said sources of control signals, with said switching member being operable to sequentially connect each of the respective sources to said control means.

5. In combination with a color television picture tube having a plurality of color reproducing phosphors, said tube having a plurality of electron beam means and means for applying color signals to said electron beam means for selectively energizing each of said phosphors, a plurality of sources of control signals, with one of said sources being provided for each of said electron beam means, and a color phasing switching mechanism operable to connect the respective control signal sources with said electron beam means to thereby control the selective energization of said phosphors.

6. In combination with a color television picture tube adapted for reproducing a televised picture in a plurality of colors, said tube having a plurality of electron beams and means for applying color signals for modulating said electron beams, control means provided for controlling said plurality of electron beams, a plurality of sources of control signals, with one of said sources being provided for each of said electron beam, a plurality of electron beam control circuits, with each of said control circuits being operative to control said control means, and a color phasing switching circuit operative to sequentially connect the respective control signal sources to the respective electron beam control circuits.

7. In apparatus for reproducing a televised picture in a plurality of colors, a picture tube having a plurality of electron beams, means for applying color signals for modulating said electron beams, a plurality of sources of control signals being provided for each of said electron beams, control means provided for controlling said plurality of electron beams, and color phasing switching apparatus operative to sequentially connect the respective sources of control signals to said control means for gating said electron beams on and off successively in accordance with said color signals.

References Cited in the file of this patent

UNITED STATES PATENTS

| | | |
|---|---|---|
| 2,389,039 | Goldsmith | Nov. 13, 1945 |
| 2,452,293 | De Forest | Oct. 26, 1948 |
| 2,461,515 | Bronwell | Feb. 15, 1949 |
| 2,543,772 | Goldmark | Mar. 6, 1951 |